United States Patent [19]

Suzuki et al.

[11] Patent Number: 4,461,170

[45] Date of Patent: Jul. 24, 1984

[54] FUEL INJECTION DEVICE FOR DIESEL ENGINES

[75] Inventors: Yutaka Suzuki, Nishio; Taro Tanaka, Nagoya; Osamu Ito, Toyota; Nobuhito Hobo, Inuyama; Yoshihiko Tsuzuki, Toyota; Satoshi Haseda, Kariya, all of Japan

[73] Assignee: Nippondenso Co., Ltd., Kariya, Japan

[21] Appl. No.: 440,346

[22] Filed: Nov. 9, 1982

[30] Foreign Application Priority Data

Nov. 10, 1981 [JP] Japan ............................ 56-180886
Nov. 30, 1981 [JP] Japan ............................ 56-192478

[51] Int. Cl.³ ........................................ G01N 15/00
[52] U.S. Cl. ............................................ 73/119 A
[58] Field of Search .................. 73/119 A; 239/533.2, 239/533.3

[56] References Cited

U.S. PATENT DOCUMENTS 3,596,507 8/1971 Oshima ............................ 73/119 A
4,337,648 7/1982 Gillespie ....................... 73/119 A X
4,356,979 11/1982 Dobler ......................... 73/119 A X
4,359,895 11/1982 Wolff ............................ 73/119 A
4,373,384 2/1983 Olson ............................ 73/119 A
4,414,845 11/1983 Hofmann ......................... 73/119 A

*Primary Examiner*—Jerry W. Myracle
*Assistant Examiner*—Vincent P. Kovalick
*Attorney, Agent, or Firm*—Cushman, Darby & Cushman

[57] ABSTRACT

A fuel injection device for Diesel engines includes a combustion detector comprising a photoelectric transducer and a light path extended through a nozzle body to transmit the light of a combustion flame developed in an engine cylinder to the photoelectric transducer. One end of the light path is opened to an oil sump communicating with a nozzle opening so that only when the nozzle opening is opened for injecting fuel and then a combustion flame is developed, the light of the flame is passed through the light path and reaches the photoelectric transducer thereby generating an electric signal indicative of the actual time of the combustion. The whole or part of the light path may be comprised of optical fibers.

7 Claims, 4 Drawing Figures

FUEL INJECTION DEVICE FOR DIESEL ENGINES

BACKGROUND OF THE INVENTION

The present invention relates to a Diesel engine fuel injection device having a detector for detecting the actual time of combustion from the flame caused by the combustion of mixture.

In the Diesel engine, in order to produce its power output efficiently, the timing of fuel injection must be varied in accordance with the magnitude of the engine speed and load, for example, To accomplish this, the actual time of injection must be detected. In the past, a method of detecting the actual time of fuel injection has been proposed in which the occurrence of a flame is used as an actual injection time signal by means of a combustion detector disposed in the cylinder. Although this method is advantageous in that there is no need to provide compensation for the injection system, the ignition lag in the engine, etc., and that the accuracy of the actual injection timing with respect to the desired injection timing is improved, the detector for detecting the flame comprises a photoelectric transducer, e.g., a phototransistor mounted to face a hole formed in the cylinder through the intermediary of a light transmitting material such as glass and thus there is a disadvantage that soot is deposited on the surface of the glass exposed to the inside of the cylinder as the engine is operated over a long period of time and the light transmission properties are deteriorated thus gradually degrading the detection sensitivity and eventually making it impossible to detect the flame.

SUMMARY OF THE INVENTION

It is therefore the primary object of the present invention to provide a Diesel engine fuel injection device having a combustion detector which overcomes the foregoing deficiencies in the prior art, eliminates the deposition of soot inside the engine cylinder, maintains an excellent detection sensitivity and ensures the stable detection of flame over a long period of time.

In accordance with one form of the invention, there is provided a fuel injection device having a detector for sensing a flame of combustion inside the cylinder through the opening of a fuel injection nozzle upon injection of the fuel. Thus, the detector is constructed such that the detecting surface of the combustion flame sensing detector is exposed to the inside of the cylinder only when the nozzle is opened and also the nozzle opening is cleaned by the fuel upon each fuel injection thus eliminating the disadvantage of deterioration in the detection sensitivity due to the deposition of soot within the cylinder and ensuring the stable detection of actual combustion time signals over a long period of time.

In accordance with another form of the invention there is provided a fuel injection device having a detector including optical fibers for sensing the light of combustion inside the cylinder through the opening of a fuel injection nozzle upon injection of the fuel. The optical fibers maintain the attenuation of the combustion light at a low level and apply the combustion light to a photoelectric transducer thereby ensuring the generation of actual combustion time signals over a long period of time. Further, the combustion light is directly applied to the photoelectric transducer through the optical fiber with the result that there is no occurrence of interference due to electromagnetic induction and also there is no danger of causing electric sparks between the optical fibers and the transducer making the device highly reliable in operation.

DESCRIPTION OF THE PREFERRED EMBODIMENTS

Figure 1:
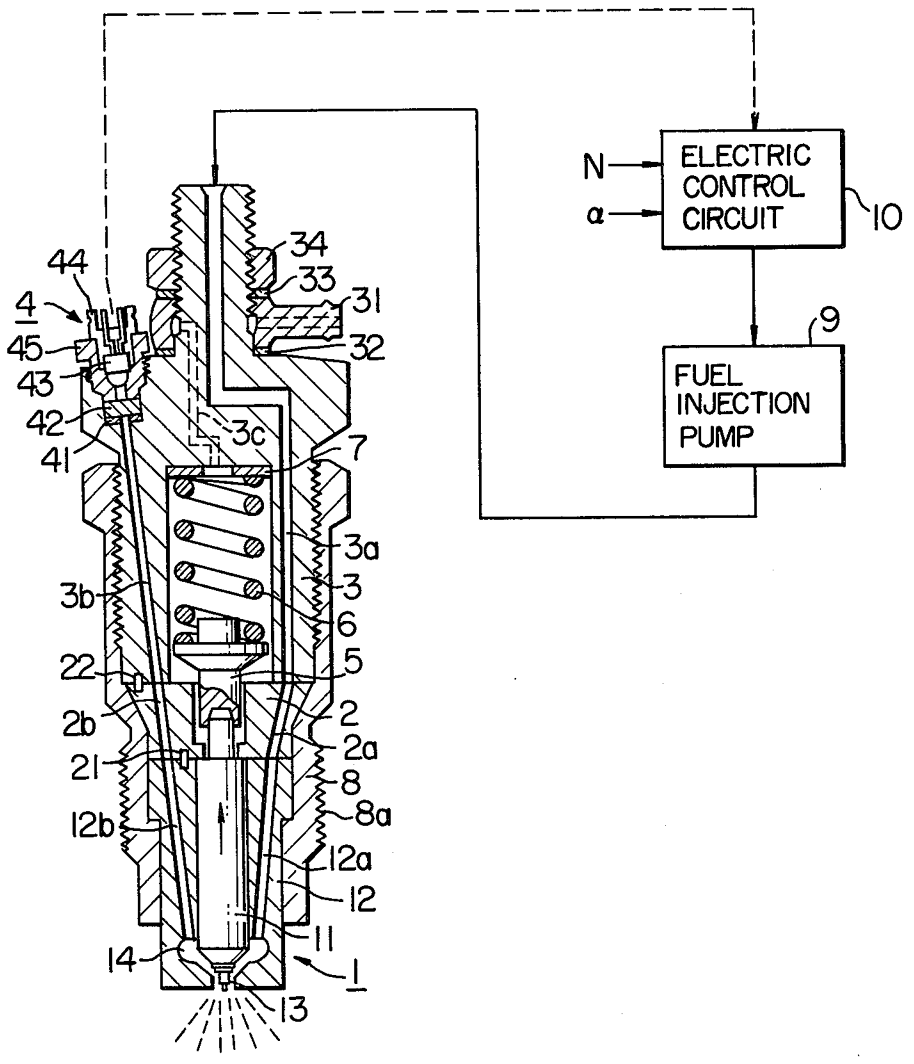
FIG. 1 is a sectional view showing the construction of an embodiment of the invention.

Referring to FIG. 1, numeral 1 designates a nozzle comprising a nozzle needle 11 and a nozzle body 12, and the nozzle body 12 is formed with a fuel passage **12*a* and a passage 12*b* for the light of combustion flame. One end of the light passage 12*b* is opened to an oil sump 14 communicating with a nozzle opening 13. The nozzle opening 13 is opened only when the fuel is injected. Numeral 2 designates a distance piece formed with a fuel passage 2*a* and a light passage 2*b* in the like manner as the nozzle body 12. Also, the nozzle body 12 and the distance piece 2 are positioned in the direction of rotation by lock pins 21 so as to align their light passages. Numeral 3 designates a nozzle body holder formed with a fuel passage 3*a* and a light passage 3*b*, and disposed at the upper end of the light passage 3*b* is an actual combustion time detector 4 comprising a ring-shaped gasket 41, a spacer 42 made of a reinforced glass or the like and having light transmission properties, a photoelectric transducer 43 for converting the presence of light to an electric signal, a connector 44 for delivering the signal from the photoelectric transducer 43 and a housing 45 for holding the photoelectric transducer 43 and the connector 44. The distance piece 2 and the nozzle holder body 3 are positioned in the direction of rotation by lock pins 22 so as to align the light passage 2*b* and the light passage 3*b*. Numeral 3*c* designates a fuel return passage communicating with a fuel tank through a nipple 31. Numerals 32 and 33 designate gaskets, and 34 a nut. Numeral 5 designates a nozzle holder pressure pin, 6 a nozzle holder pressure spring, and 7 a spring seat. Numeral 8 designates a nozzle retaining nut holding the nozzle 1 and the nozzle holder 3 in place and fitted by means of its threaded portion 8*a* into the engine cylinder head so as to position the nozzle 1 opposite to the cylinder chamber. Numeral 9 designates a fuel injection pump of the distribution or in-line type for delivering the fuel to the injection device, and 10 an electric control circuit for actuating an injection quantity adjusting member to control the injection quantity of the injection pump and actuating a timer mechanism to control the injection timing and receiving the signal from the actual combustion time detector 4** as well as engine operating condition indicative signals, e.g., a rotational speed signal N and an accelerator position signal $\alpha$.

With the construction described above, the operation of the embodiment is as follows. The fuel forced from the fuel injection pump 9 in response to the signal from the electric control circuit 10 which is determined by the operating conditions of the engine, is passed through the fuel passages **3*a*, 2*a* and 12*a*, forces the nozzle needle 11** upward against the nozzle holder pressure spring 6 and is injected through the opening 13. At that time, the pressure and temperature within the cylinder are high so that the injected fuel is ignited and a flame is developed. In this case, the combustion light is introduced via the opening 13 and reaches the photoelectric transducer 43 through the oil sump 14, the light passage 12*b* of the nozzle body 12, the light passage 3*b* of the nozzle holder 3 and the light transmission spacer 42 and the electric control circuit 10 detects the combustion light as an actual combustion time signal. This signal is used for feedback controlling the fuel injection timing, for example.

Figure 2:
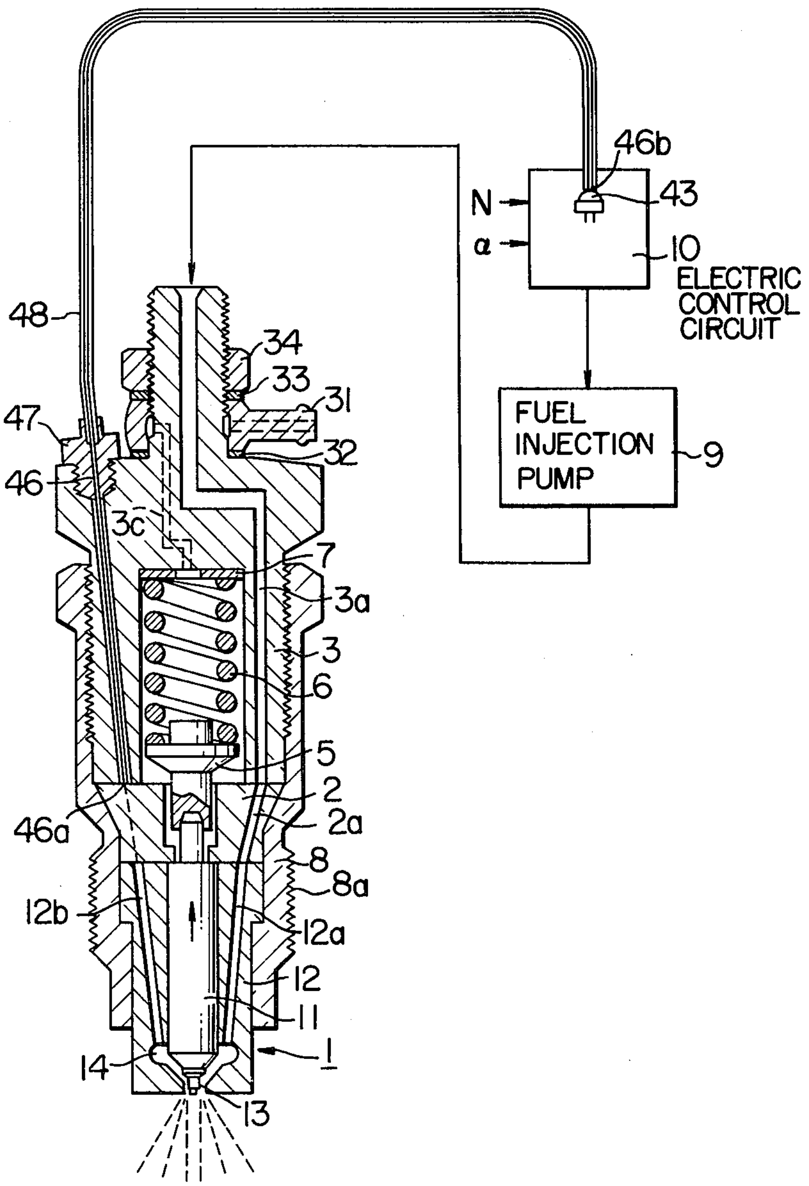
FIG. 2 is a sectional view showing the construction of another embodiment of the invention.

While, in the above-described embodiment, the photoelectric transducer 43 is disposed in the nozzle holder 3, it is possible to arrange so that the light is introduced into the electric control circuit 10 through optical fibers 46 as shown in FIG. 2. In FIG. 2, the optical fibers 46 comprise a bundle of glass fibers of several tens microns and the light introduced through an end 46*a* is transmitted to the photoelectric transducer 43 in the electric control circuit 10. Numeral 47 designates a housing for the optical fibers 46, which is fitted into the hole formed in the nozzle holder 3 so as to hold the optical fibers 46 in place. Numeral 48 designates a sheath for the optical fibers 46 which is made of a flexible plastic material or the like. On the other hand, the distance piece 2 is made of a light transmitting material such as a reinforced glass and constructed to pass the combustion light but serve as a seal for the fuel. The operation is the same with the embodiment described previously.

Figure 3:
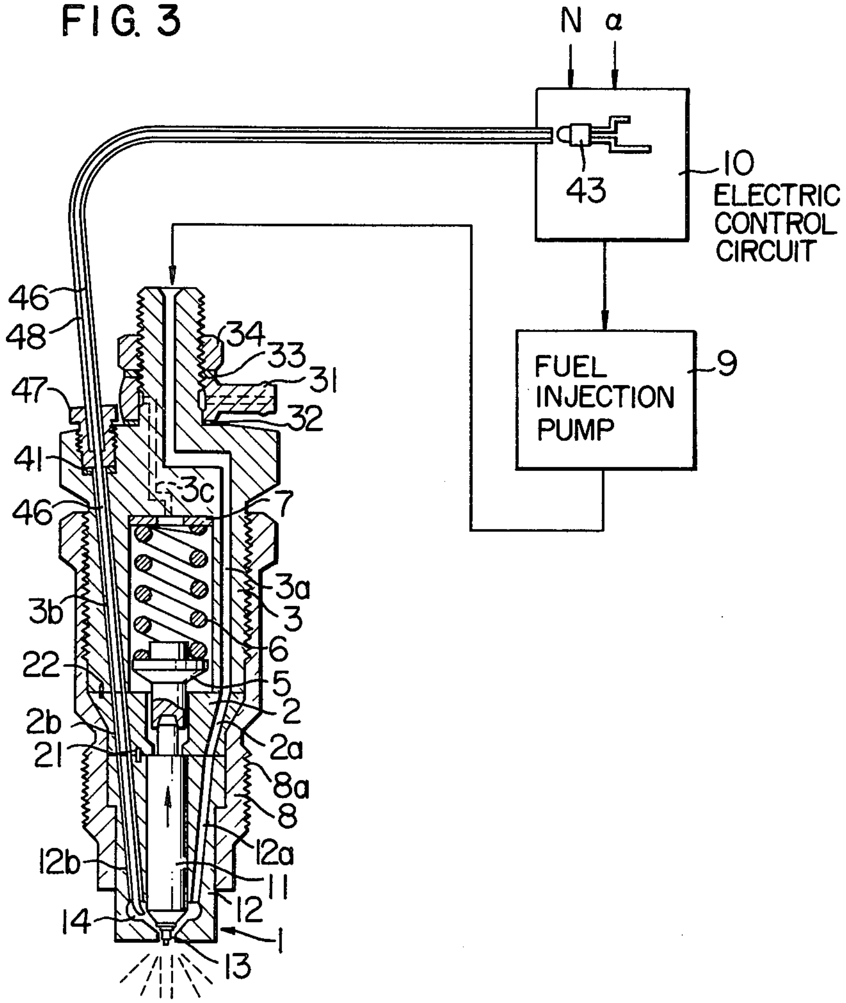
FIG. 3 is a sectional view showing the construction of still another embodiment of the invention.

The embodiment shown in FIG. 3 differs from the embodiment of FIG. 2 in that the forward end portion of the optical fibers 46 is extended through the distance piece 2 and the nozzle body 12 to reach the oil sump 14 near the nozzle opening 13. Thus, the distance piece 2 and the nozzle body 12 are respectively formed with optical fiber insertion holes 2*b* and 12*b*. Numeral 3*b* designates an insertion hole formed in the nozzle holder 3 and having an internal thread formed at the upper end thereof.

The fiber holder or housing 47 is a hollow cylinder into which the fibers 46 are inserted and bonded by the setting of a resin adhesive. The upper end of the holder 47 includes the sheath 48 bonded by setting and the sheathed fibers 46 are brought to the outside of the fiber holder 47. The fiber holder 47 is screwed into the nozzle holder 3 with the ring-shaped gasket 41 being held therebetween thus providing a seal for the fuel in the sump 14. The fibers 46 are arranged to extend slightly into the sump 14 and thereby to be readily exposed to the combustion light.

The electric control circuit 10 for controlling the injection timing through the operation of the timer mechanism includes the photoelectric transducer 43, and the optical fibers 46 face the photoelectric transducer 43. The electric control circuit 10 receives the actual combustion time signal from the optical fibers 46 as well as signals indicative of the engine operating conditions e.g., a rotational speed signal N and an accelerator position signal $\alpha$.

When the fuel is injected through the nozzle opening 13, the temperature and pressure inside the cylinder are so high that the fuel is ignited and a flame is developed. Thus, the combustion light enters through the nozzle opening 13 and reaches the photoelectric transducer 43 through the optical fibers 46 in the fiber holder 47 which are inserted in the holes 12*b*, 2*b* and 3*b* formed through the nozzle body 12, the distance piece 2 and the nozzle holder body 3 allowing the electric control circuit 10 to detect it as the actual injection time signal. This signal is used for example to feedback control the fuel injection timing.

Figure 4:
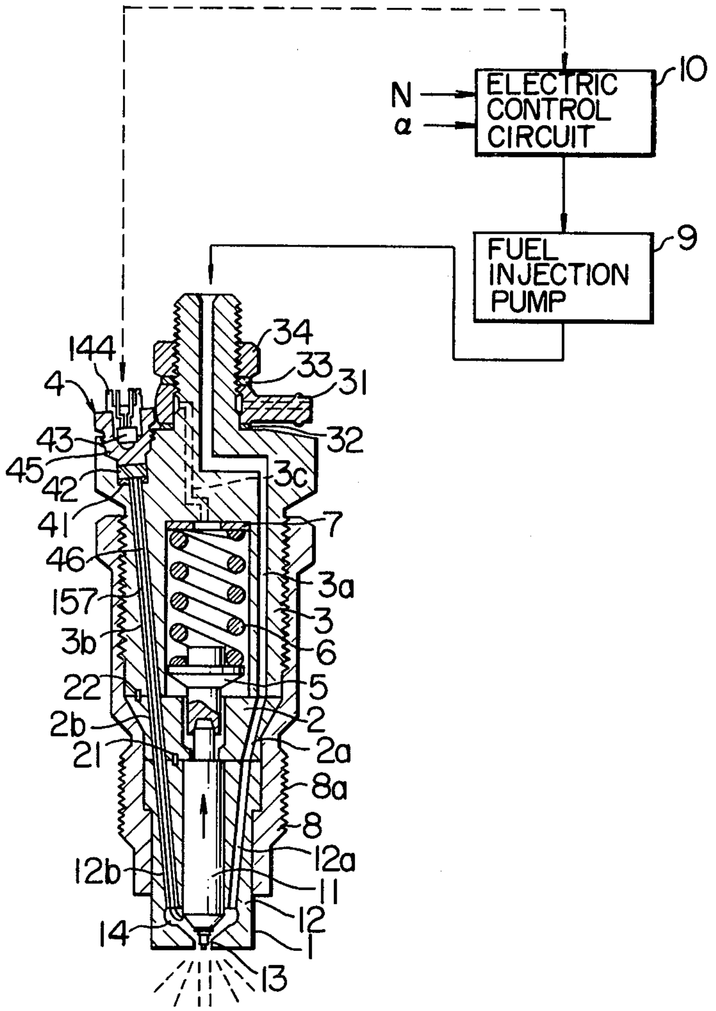
FIG. 4 is a sectional view showing the construction of still another embodiment of the invention.

While, in the above-described embodiment, the optical fibers 46 are brought to the outside of the nozzle holder body 3, the photoelectric transducer 43 may be mounted at one end of the nozzle holder body 3 as in the case of another embodiment which is shown in FIG. 4. In the Figure, numeral 157 designates a cylindrical fiber holder in which optical fibers 46 are bonded by the setting of a resin adhesive and it forms a passage for the combustion light introduced through an opening 13. Numeral 43 designates a light transmitting spacer made of a reinforced glass or the like. An actual combustion time detector 4 comprising a photoelectric transducer 43 for converting the presence of light to an electric signal, a connector 44 for delivering the signal from the photoelectric transducer 43 and a housing 45 for holding the photoelectric transducer 43 and the connector 44 in place is mounted to a nozzle holder body 3 with a gasket 41 being inserted therebetween. The combustion light introduced through the opening 13 reaches the photoelectric transducer 43 through the optical fibers 46 within the fiber holder 157 and the reinforced glass spacer 42. The remain-construction and operation are the same with the embodiment of FIG. 3.

We claim:

1. In a fuel injection device for Diesel engines comprising a fuel injection nozzle mounted to an engine to inject fuel into a combustion chamber of said engine, said nozzle having a nozzle body formed at the forward end thereof with a nozzle opening and partly projecting into said combustion chamber, a nozzle needle slidably disposed in said nozzle body to open and close said nozzle opening and an oil sump disposed at the forward end of said nozzle body and operatively communicating with said nozzle opening, the improvement comprising:
   - light path means disposed in said nozzle body and having one end thereof opened to said oil sump to transmit a light of a flame caused by the burning of a mixture in said combustion chamber; and
   - photoelectric transducer means responsive to said light transmitted from said light path means to generate an electric signal.

2. A fuel injection device according to claim 1, wherein said light path means comprises optical fibers having the forward ends thereof extended into said oil sump.

3. A fuel injection device according to claim 1, wherein said photoelectric transducer means is fixedly mounted to said fuel injection nozzle.

4. A fuel injection device according to claim 1, wherein said photoelectric transducer means is included in an electric control circuit for controlling the injection of fuel and connected to said light path means and optical fibers.

5. A fuel injection device according to claim 1, wherein said light path means comprises a cylindrical fiber holder and optical fibers bonded to the inside of said fiber holder by the setting of a resin adhesive.

6. In a fuel injection device for Diesel engines comprising a fuel injection nozzle mounted to an engine to inject fuel into a combustion chamber of said engine, said nozzle having a nozzle body formed at the forward end thereof with a nozzle opening and partly projecting into said combustion engine, a nozzle needle slidably disposed in said nozzle body to open and close said nozzle opening, an oil sump disposed at the forward end of said nozzle body to operatively communicate with said nozzle opening and a fuel passage formed in said nozzle body and communicated with said oil sump to supply a high-pressure fuel thereof, the improvement comprising:

photoelectric transducer means; and light transmitting means extending through said nozzle body and having one end thereof opened to said fuel sump to transmit a light of a flame caused by the burning of a mixture in said combustion chamber to said photoelectric transducer means.

7. A fuel injection device according to claim 6, wherein said light transmitting means comprises optical fibers.

* * * * *